(12) United States Patent
Buiel et al.

(10) Patent No.: US 8,192,865 B2
(45) Date of Patent: *Jun. 5, 2012

(54) NEGATIVE ELECTRODE FOR HYBRID ENERGY STORAGE DEVICE

(75) Inventors: Edward Buiel, New Castle, PA (US); Victor Eshkenazi, Vaughan (CA); Leonid Rabinovich, Thornhill (CA); Wei Sun, New Castle, PA (US); Vladimir Vichnyakov, Newmarket (CA); Adam Swiecki, Milton (CA); Joseph Cole, New Castle, PA (US)

(73) Assignee: Axion Power International Inc., New Castle, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,234

(22) Filed: Jun. 28, 2011

(65) Prior Publication Data

US 2011/0281162 A1 Nov. 17, 2011

Related U.S. Application Data

(63) Continuation of application No. 12/446,628, filed as application No. PCT/US2007/082047 on Oct. 22, 2007, now Pat. No. 7,998,616.

(60) Provisional application No. 60/853,439, filed on Oct. 23, 2006.

(51) Int. Cl.
*H01M 4/02* (2006.01)
*H01M 2/02* (2006.01)
*H01M 4/72* (2006.01)
*H01M 4/66* (2006.01)
*H01M 4/64* (2006.01)
*H01G 9/04* (2006.01)

(52) U.S. Cl. ........ 429/211; 429/181; 429/234; 429/245; 429/231.8; 429/231.5

(58) Field of Classification Search ................. 429/212, 429/181, 182, 183, 178, 232, 339, 234, 245, 429/231.8, 231.5, 211; 252/182.1; 29/623.1; 361/502

See application file for complete search history.

(56) References Cited

U.S. PATENT DOCUMENTS

| | | | |
|---|---|---|---|
| 1,594,810 A | 8/1926 | Benner et al. |
| 3,275,473 A | 9/1966 | Barnett et al. |
| 3,352,718 A | 11/1967 | Carson, Jr. et al. |
| 3,434,883 A | 3/1969 | Babusci et al. |

(Continued)

FOREIGN PATENT DOCUMENTS

JP 07235454 A 9/1995

(Continued)

OTHER PUBLICATIONS

English Abstract of JP16355823.

(Continued)

*Primary Examiner* — Jonathan Crepeau
*Assistant Examiner* — Kenneth Douyette
(74) *Attorney, Agent, or Firm* — Cahn & Samuels, LLP (57) ABSTRACT

A negative electrode for a hybrid energy storage device includes a current collector; a corrosion-resistant conductive coating secured to at least one face of the current collector; a sheet comprising activated carbon adhered to the corrosion-resistant conductive coating; a tab portion extending from a side of the negative electrode; and a lug comprising a lead or lead alloy that encapsulates at least part of the tab portion.

17 Claims, 7 Drawing Sheets

U.S. PATENT DOCUMENTS

| | | | |
|---|---|---|---|
| 3,457,112 A | 7/1969 | Reber | |
| 3,692,587 A | 9/1972 | Faust et al. | |
| 3,856,574 A | 12/1974 | Amagi et al. | |
| 3,859,134 A | 1/1975 | Shirodker | |
| 3,926,764 A | 12/1975 | Ruzicka et al. | |
| 4,014,730 A | 3/1977 | Selover, Jr. et al. | |
| 4,265,952 A | 5/1981 | Caines | |
| 4,438,481 A | 3/1984 | Phillips et al. | |
| 4,725,927 A | 2/1988 | Morimoto et al. | |
| 4,862,328 A | 8/1989 | Morimoto et al. | |
| 5,006,426 A | 4/1991 | Suzuki et al. | |
| 5,162,172 A | 11/1992 | Kaun | |
| 5,456,813 A | 10/1995 | Grange-Cossou et al. | |
| 5,494,763 A | 2/1996 | Behl et al. | |
| 5,581,438 A | 12/1996 | Halliop | |
| 5,663,015 A * | 9/1997 | Hooke et al. | 429/181 |
| 5,744,258 A | 4/1998 | Bai et al. | |
| 6,195,252 B1 | 2/2001 | Belyakov et al. | |
| 6,222,723 B1 | 4/2001 | Razoumov et al. | |
| 6,335,858 B1 | 1/2002 | Vasechkin et al. | |
| 6,426,862 B1 | 7/2002 | Vasechkin et al. | |
| 6,466,429 B1 | 10/2002 | Volfkovich et al. | |
| 6,531,240 B1 | 3/2003 | Brown et al. | |
| 6,628,504 B2 | 9/2003 | Volfkovich et al. | |
| 6,643,119 B2 | 11/2003 | Nanjundiah et al. | |
| 6,706,079 B1 | 3/2004 | Shmatko et al. | |
| 6,946,007 B2 | 9/2005 | Bendale et al. | |
| 7,006,346 B2 | 2/2006 | Volfkovich et al. | |
| 7,110,242 B2 | 9/2006 | Adrianov et al. | |
| 7,119,047 B1 | 10/2006 | Adrianov et al. | |
| 7,312,976 B2 | 12/2007 | Kazaryan et al. | |
| 2001/0003024 A1 | 6/2001 | Nemoto | |
| 2002/0080553 A1 | 6/2002 | Pekala | |
| 2002/0136948 A1 * | 9/2002 | Missling et al. | 429/212 |
| 2003/0086238 A1 | 5/2003 | Bendale et al. | |
| 2003/0110607 A1 | 6/2003 | Bendale et al. | |
| 2003/0111512 A1 | 6/2003 | O'Connell et al. | |
| 2004/0005502 A1 | 1/2004 | Schlag | |
| 2004/0253512 A1 | 12/2004 | Watanabe et al. | |
| 2005/0002150 A1 | 1/2005 | Volfkovich et al. | |
| 2005/0153202 A1 * | 7/2005 | Ratte et al. | 429/178 |
| 2006/0073345 A1 | 4/2006 | Naruse | |
| 2006/0147792 A1 | 7/2006 | Nelson et al. | |
| 2006/0292384 A1 | 12/2006 | Kazaryan et al. | |
| 2007/0003833 A1 | 1/2007 | Li et al. | |
| 2007/0104981 A1 | 5/2007 | Lam et al. | |
| 2008/0100990 A1 | 5/2008 | Buiel et al. | |
| 2008/0113268 A1 | 5/2008 | Buiel et al. | |
| 2008/0131763 A1 | 6/2008 | Buiel et al. | |
| 2009/0035657 A1 | 2/2009 | Buiel et al. | |
| 2009/0103242 A1 | 4/2009 | Buiel et al. | |

FOREIGN PATENT DOCUMENTS

JP  16355823 A  12/2004

OTHER PUBLICATIONS

English Abstract of JP07235454.
English Abstract of JP16355823, Dec. 16, 2004.
English Abstract of JP07235454, Sep. 5, 1995.

* cited by examiner

NEGATIVE ELECTRODE FOR HYBRID ENERGY STORAGE DEVICE

This patent application is a Continuation Application of U.S. Ser. No. 12/446,628 filed on 22 Apr. 2009 now U.S. Pat. No. 7,998,616, which is a U.S. national stage application of PCT international application PCT/US2007/082047 filed on 22 Oct. 2007. U.S. Ser. No. 12/446,628 claims priority of U.S. provisional application Ser. No. 60/853,439 filed on 23 Oct. 2006, the entireties of which are incorporated by reference herein.

I. FIELD OF INVENTION

The present invention relates to a negative electrode for a hybrid energy storage device.

II. BACKGROUND OF INVENTION

Hybrid energy storage devices, also known as asymmetric supercapacitors or hybrid battery/supercapacitors, combine battery electrodes and supercapacitor electrodes to produce devices having a unique set of characteristics including cycle life, power density, energy capacity, fast recharge capability, and a wide range of temperature operability. Hybrid lead-carbon energy storage devices employ lead-acid battery positive electrodes and supercapacitor negative electrodes. See, for example, U.S. Pat. Nos. 6,466,429; 6,628,504; 6,706,079; 7,006,346; and 7,110,242.

The conventional wisdom is that any new battery or supercapacitor technology assembles components and uses techniques that are unique to that technology. Moreover, the conventional wisdom is that lead-carbon energy storage devices are required to be assembled using relatively high compression of the cell or cells within the device. The high compression is due in part to the large contact resistance existing between an activated carbon active material and a current collector of a negative electrode. It is also conventional wisdom that equipment generally used to manufacture conventional lead-acid batteries and commonly employed in the automotive industry, motive power, stationary, and other energy storage applications cannot be employed in the production of hybrid energy storage devices.

The present invention provides a negative electrode for hybrid energy storage devices, which are capable of being manufactured using available conventional lead-acid battery manufacturing equipment. The inventors have proven that single cell and multi-cell hybrid energy storage devices may be manufactured using conventional lead acid-battery manufacturing equipment with modifications. Cast-on equipment may be adapted to handle activated carbon-based negative electrodes in a similar manner to how conventional lead acid battery lead-based negative electrodes are handled.

It is a purpose of the present invention to provide negative electrodes for hybrid energy storage devices, which may be manufactured using easily available and relatively inexpensive conventional lead-acid battery manufacturing equipment. These negative electrodes embody a modified design to reduce the need for large stack pressure and to obtain acceptable electrochemical performance. Accordingly, the negative electrodes are compatible with existing lead-acid battery manufacturing techniques.

III. SUMMARY OF INVENTION

It is an object of the present invention to provide a negative electrode for a hybrid energy storage device.

It is another object of the present invention to provide negative electrodes for hybrid energy storage devices that are capable of being manufactured using conventional lead-acid battery manufacturing equipment.

An advantage of the present invention is that an active material of the negative electrode is laminated onto an expanded graphite material, thereby eliminating the need for high stack pressure and achieving good contact resistance properties.

The above objects and advantages are satisfied by a negative electrode for a hybrid energy storage device comprising a current collector; a corrosion-resistant conductive coating secured to at least one face of the current collector; and a sheet comprising activated carbon adhered to and in electrical contact with the corrosion-resistant conductive coating. A tab portion extends from a side of the current collector. A lug comprising a lead or lead alloy encapsulates at least part of the tab portion.

As used herein "substantially", "generally", "relatively", "approximately", and "about" are relative modifiers intended to indicate permissible variation from the characteristic so modified. It is not intended to be limited to the absolute value or characteristic which it modifies but rather approaching or approximating such a physical or functional characteristic.

References to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

In the following description, reference is made to the accompanying drawings, which are shown by way of illustration to specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

V. DETAILED DESCRIPTION OF INVENTION

FIGS. 1-7B illustrate a negative electrode for a hybrid energy storage device according to the present invention.

Figure 1:
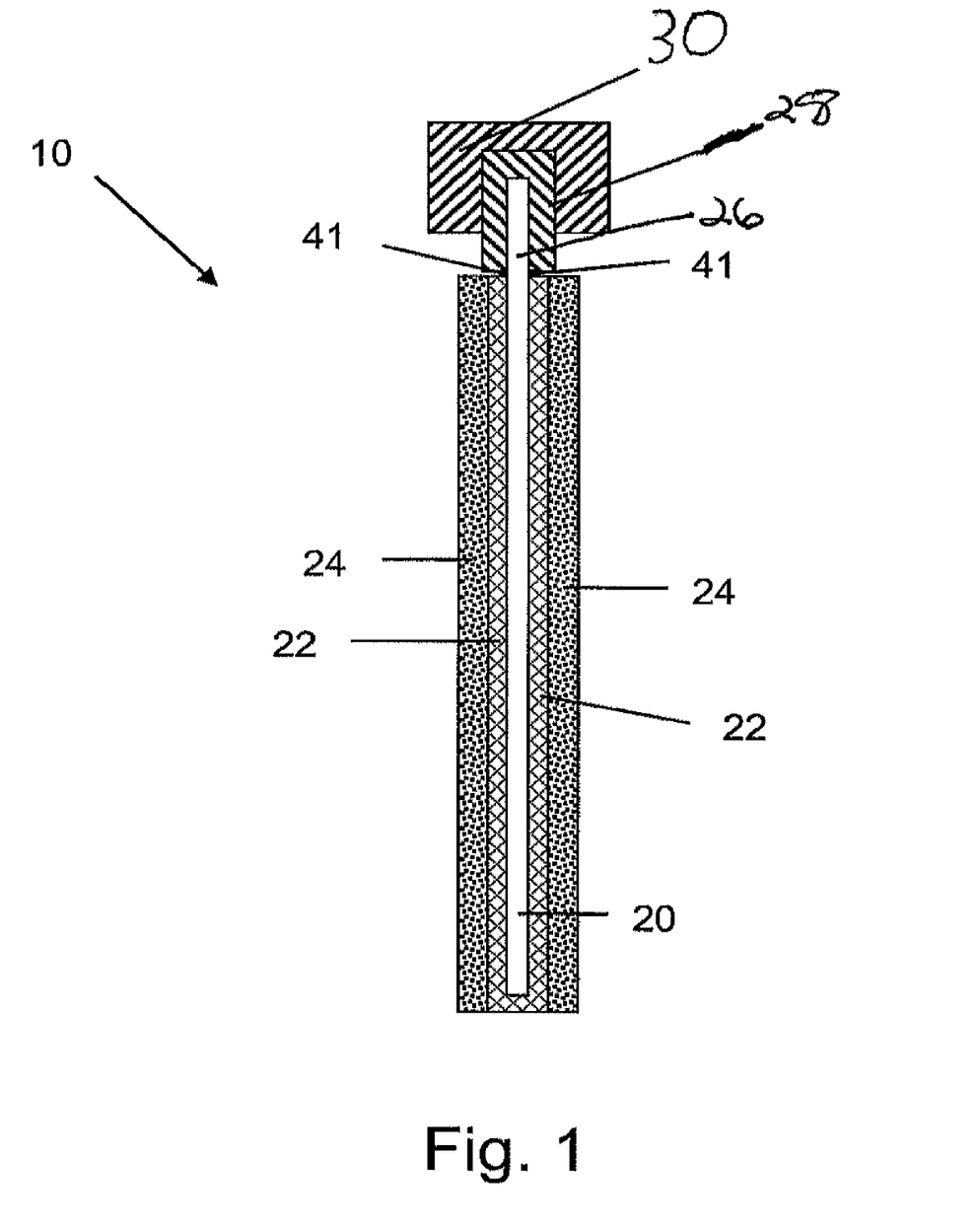
FIG. 1 is a schematic cross-section view of a negative electrode according to an embodiment of the present invention.

FIG. 1 illustrates a negative electrode 10 according to an embodiment of the present invention. The negative electrode 10 comprises a current collector 20. The current collector 20 may be of any effective geometric shape, but is preferably planar and in the form of a sheet, foil, or mesh. At least a substantial portion, if not all, of the surface of at least one face of the current collector 20 is protected against corrosion by having a corrosion-resistant conductive coating 22 secured thereto.

The negative electrode also comprises an electrochemically active material 24 adhered to and in electrical contact with the corrosion-resistant coating 22. In certain embodiments, the corrosion-resistant conductive coating 22 is wrapped around the bottom of the current collector 20.

A. Current Collector

The current collector 20 comprises a conductive material. For example, the current collector 20 may comprise a metallic material such as beryllium, bronze, leaded commercial bronze, copper, copper alloy, silver, gold, titanium, aluminum, aluminum alloys, iron, steel, magnesium, stainless steel, nickel, mixtures thereof, or alloys thereof. Preferably, the current collector comprises copper or a copper alloy. The material of the current collector 20 may be made from a mesh material (e.g., copper mesh) onto the surface of which coating 22 is pressed to achieve an anti-corrosive coating on the current collector.

The current collector may comprise any conductive material having a conductivity greater than about $1.0 \times 10^5$ siemens/m. If the material exhibits anisotropic conduction, it should exhibit a conductivity greater than about $1.0 \times 10^5$ siemens/m in any direction.

B. Corrosion-Resistant Coating

The corrosion-resistant conductive coating 22 is chemically resistant and electrochemically stable in the presence of an electrolyte, for example, an acid electrolyte such as sulfuric acid or any other electrolyte containing sulfur. Thus, ionic flow to or from the current collector is precluded, while electronic conductivity is permitted.

The corrosion-resistant coating 22 preferably comprises an impregnated graphite material. The graphite is impregnated with a substance to make the graphite sheet or foil acid-resistant. The substance may be a non-polymeric substance such as paraffin or furfural. In certain embodiments, the impregnating substance exhibits thermoplastic properties and may have a melting temperature in the range of about 25° C. to about 400° C.

Preferably, the graphite is impregnated with paraffin and rosin. In embodiments, the graphite may be impregnated with a mixture of about 90 to about 99 wt. % paraffin and about 1 to about 10 wt. % rosin, preferably about 2 to about 3 wt. % rosin, based upon the weight of the mixture. Rosin helps the pores in the graphite to be completely sealed and thus not permeable by an acid electrolyte.

The graphite may be in the form of a sheet or foil made from high density or low-density expanded graphite particles. Preferably, the corrosion-resistant coating comprises a low-density expanded graphite for the following reasons.

Figure 2:
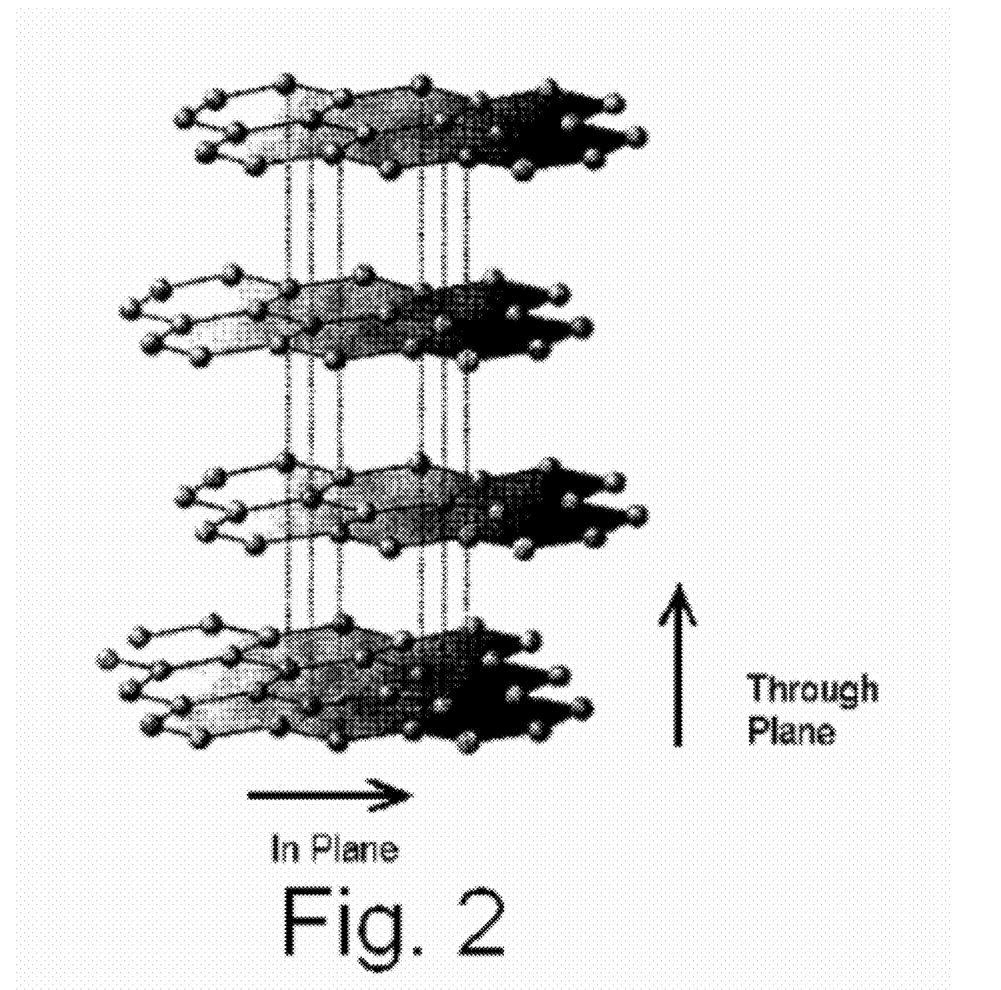
FIG. 2 is a schematic view of an expanded graphite sheet or foil of the negative electrode of FIG. 1.

The majority of the conduction of electricity from the electrochemically active material 24 through the corrosion-resistant coating 22 and to the current collector 20 is normal to the plane of the corrosion-resistant coating 22. As shown in FIG. 2, graphite exhibits anisotropic conductivity. The orientation of graphene layers in an expanded graphite sheet is such that the graphene planes substantially align with the sheet. Each graphene layer is a single planar sheet of carbon atoms having a hexagonal structure. Higher density expanded graphite sheets tend to exhibit more alignment than lower density expanded graphite sheets. When a current is applied to a sheet or foil of high density graphite material, the current tends to a laminar flow in a direction parallel to the plane of the sheet or foil (i.e., through plane). Thus, a high density graphite material exhibits resistivity to current flow in a direction perpendicular to the plane of the sheet or foil (i.e., in plane).

For low-density graphite, the conductivity (or resistivity) tends to be about the same either parallel to or perpendicular to the plane of the sheet or foil of low-density graphite. Accordingly, since current flow must be in a direction perpendicular to the face or faces of the current collector (i.e., in plane), low-density expanded graphite is preferably employed. Therefore, it is advantageous to use low-density expanded graphite, in order to achieve a greater proportion of graphene layers with at least some component of the in-plane direction aligned with the normal direction of the expanded graphite sheet, and thereby decrease the resistance of the negative electrode.

The density of an expanded graphite sheet or foil may be in the range of about 0.1 to about 2.0 g/cm$^3$, preferably about 0.2 to about 1.8 g/cm$^3$, more preferably about 0.5 to about 1.5 g/cm$^3$.

In other embodiments, the corrosion-resistant coating 22 may comprise a polymer coating comprising a conductive material such as carbon black. Alternatively, the corrosion-resistant coating 22 may comprise a conductive but corrosion-resistant material, such as titanium sub-oxide or conductive diamond materials. In embodiments, the titanium sub-oxide material may be $Ti_xO_{2x-1}$ (where x is an integer), for example, $Ti_4O_7$ or $Ti_5O_9$. Titanium sub-oxide is more conductive, thinner, and provides less electrical resistance than graphite. In embodiments, the conductive diamond material may be a layer or film deposited by a hot filament chemical vapor deposition (CVD) method, microwave plasma CVD method, plasma arc jet method, or plasma vapor deposition (PVD) method. The conductive diamond may be doped, for example, with boron.

In embodiments, the corrosion-resistant coating 22 may comprise a material that, when subject to a corrosive agent (e.g., a strong oxidizer such as sulfuric acid), forms a corrosion-resistant, acid impermeable layer. In the case of sulfuric acid, that layer may result from lead being oxidized to form lead-sulfate.

C. Electrochemical Active Material

The active material 24 of the negative electrode comprises activated carbon. Activated carbon refers to any predominantly carbon-based material that exhibits a surface area greater than about 100 m$^2$/g, for example, about 100 m$^2$/g to about 2500 m$^2$/g, as measured using conventional single-point BET techniques (for example, using equipment by Micromeritics FlowSorb III 2305/2310). In certain embodiments, the active material may comprise activated carbon, lead, and conductive carbon. For example, the active material may comprise 5-95 wt. % activated carbon; 95-5 wt. % lead; and 5-20 wt. % conductive carbon.

The active material 24 may be in the form of a sheet that is adhered to and in electrical contact with the corrosion-resistant conductive coating material 22. In embodiments, the active material is adhered to the corrosion-resistant coating by the use of a hot melt glue.

In order for the activated carbon to be adhered to and in electrical contact with the corrosion-resistant conductive coating, activated carbon particles may be mixed with a suitable binder substance such as PTFE or ultra high molecular weight polyethylene (e.g., having a molecular weight numbering in the millions, usually between about 2 and about 6 million). In embodiments, the amount of binder may be about 3 to about 25 wt. %, preferably about 5 to about 15 wt. % (for example, 10 wt. %), based upon the weight of the active material and binder. The binder material preferably does not exhibit thermoplastic properties or exhibits minimal thermoplastic properties.

The activated carbon and PTFE or ultra high molecular weight polyethylene binder reduce the pressure required to establish good electrical conductivity between the active material and the corrosion-resistant conductive coating to less than about 5 psi, preferably less than about 3 psi. In contrast, the use of polyethylene or polypropylene binders or a slurry-coated electrode with acrylic or butadiene binders require greater than 5 psi to obtain good contact between an active material and a corrosion-resistant conductive coating.

D. Tab Portion

A tab portion 26 extends from a side of the negative electrode, for example, from the current collector 20. In embodiments, the tab portion is an extension of the current collector.

A lug 28 comprising lead or lead alloy is cast onto and encapsulates at least part, preferably all, of tab portion 26. The lug 28 may be applied before the acid-resistant coating 22 and active material 24 are secured to the current collector 20, thereby limiting the exposure of these materials to high temperatures need to melt lead. Applying the lug 28 before the corrosion-resistant conductive coating 22 and active material 24, also allows hot melt glue 41 to be applied right up to the lug 28 when securing the corrosion-resistant conductive coating and the active material. In embodiments, the lug is applied to the tab portion by molding.

In embodiments, the lug may have a thickness of about 0.5 mm to about 10 mm. The thickness of the lug 28 is chosen to ensure that the seal to the tab portion 26 and corrosion-resistant coating 22 is not affected by the thermal processing that occurs during a cast-on-strap (COS) operation. According to the present invention, a cast-on strap 30 comprising lead or lead alloy may be cast onto at least a part of lug 28.

The lug 28 ensures that the current collector 20 does not corrode from an electrolyte. In certain embodiments, the lead in the lug will react with a sulfuric acid electrolyte to form PbSO$_4$, forming a barrier to corrosion. Based upon accelerated testing, the lug provides for about 5 years to about 10 years of protection from corrosion of the current collector. In contrast, use of a plastic sleeve to protect a tab portion and the current collector fails readily, as the acidic electrolyte quickly penetrates between the plastic and the tab portion.

EXAMPLES

Example 1

Impregnated Graphite Corrosion-Resistant Coating

Nine negative electrodes were made without an active material, but with 3 different types of graphite foil (grafoil). Indicating paper was cut to fit (wrap around) on both sides of a copper current collector. Four electrodes were made using an automated glue machine and 5 electrodes were made with the same glue but applied by hand, so that if there are leaks from the glue it could be determined whether there is a faulty glue process or a failure of the glue.

All electrodes were saturated with sulfuric acid, squeezed tightly into a battery case, and then pressurized at 35 psi for 30 minutes. After depressurizing, the electrodes were carefully rinsed and the grafoil was peeled away from the copper current collector to look for signs of leaking.

Figure 3:
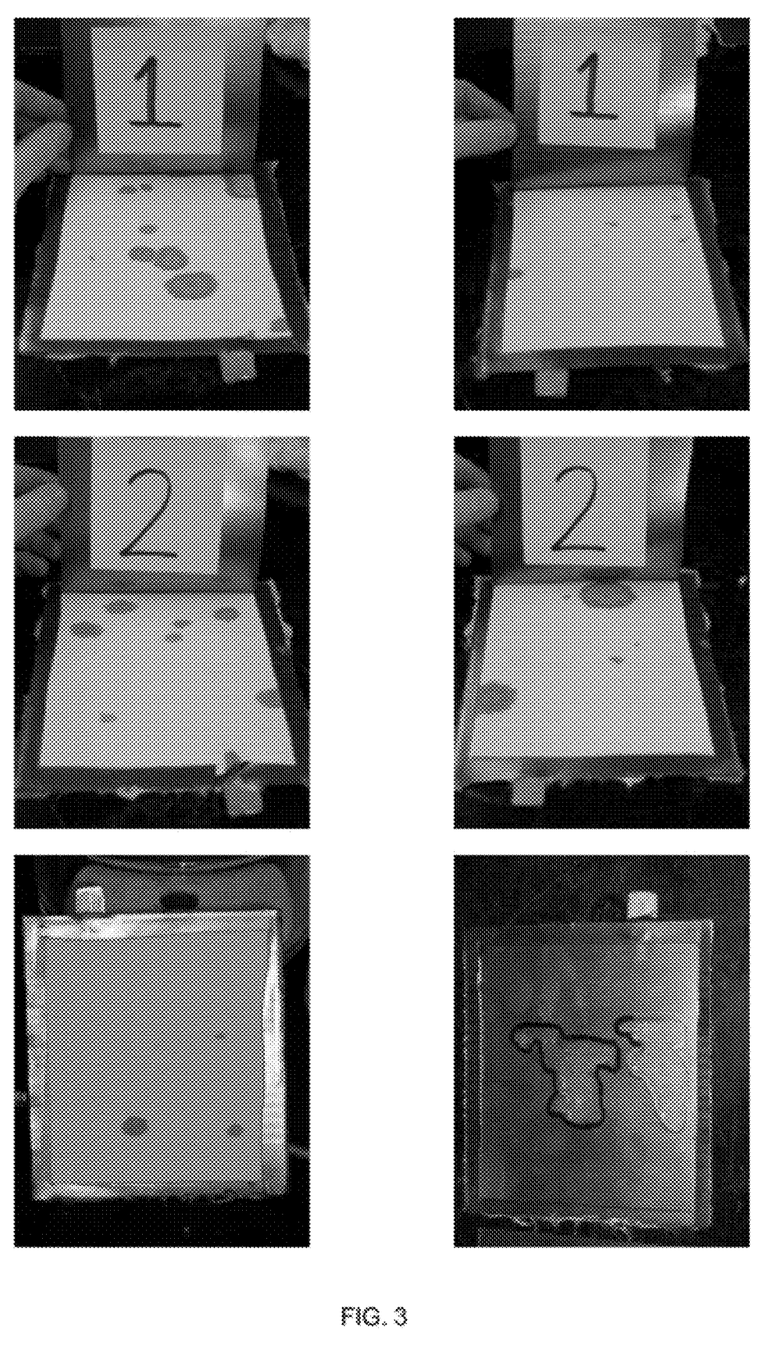
FIG. 3 shows acid leakage for an expanded graphite sheet or foil impregnated with paraffin.
Figure 4:
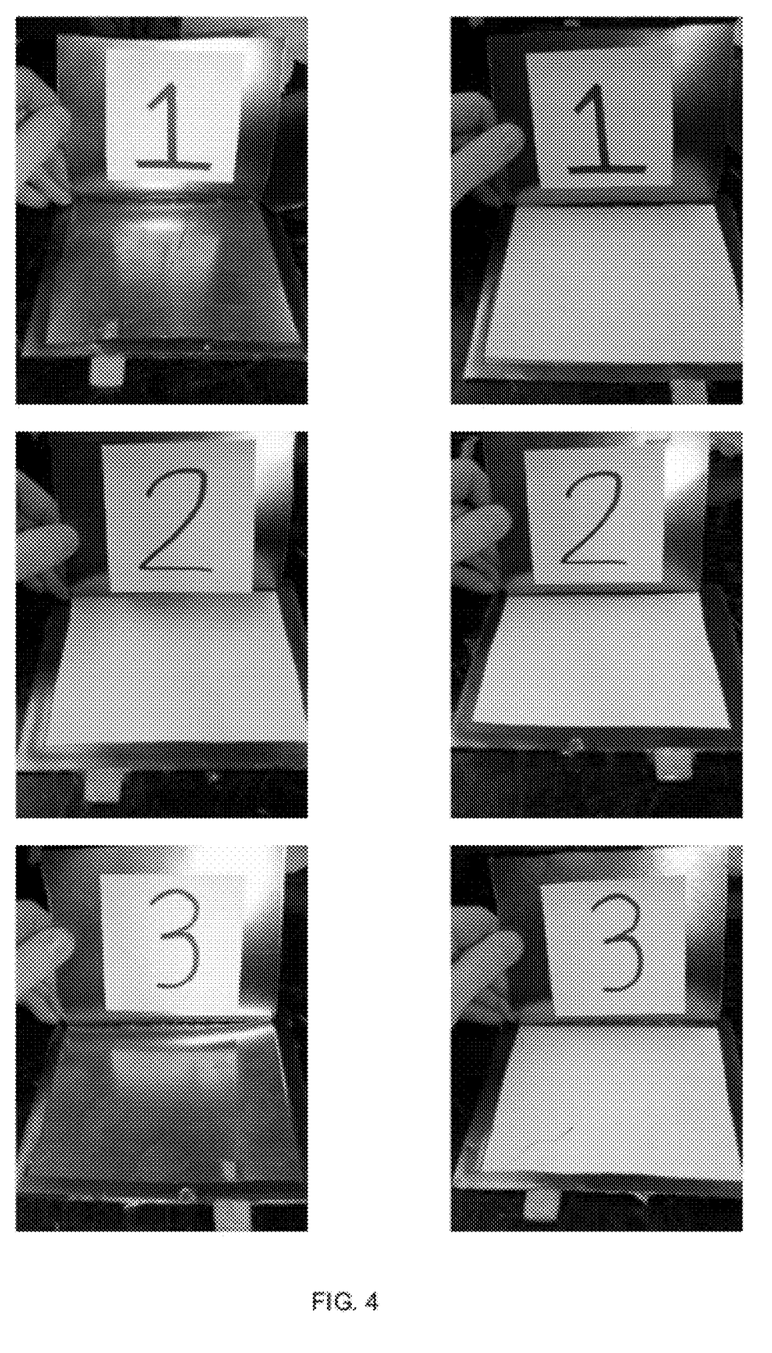
FIG. 4 shows no acid leakage for an expanded graphite sheet or foil impregnated with paraffin and rosin.
Figure 5:
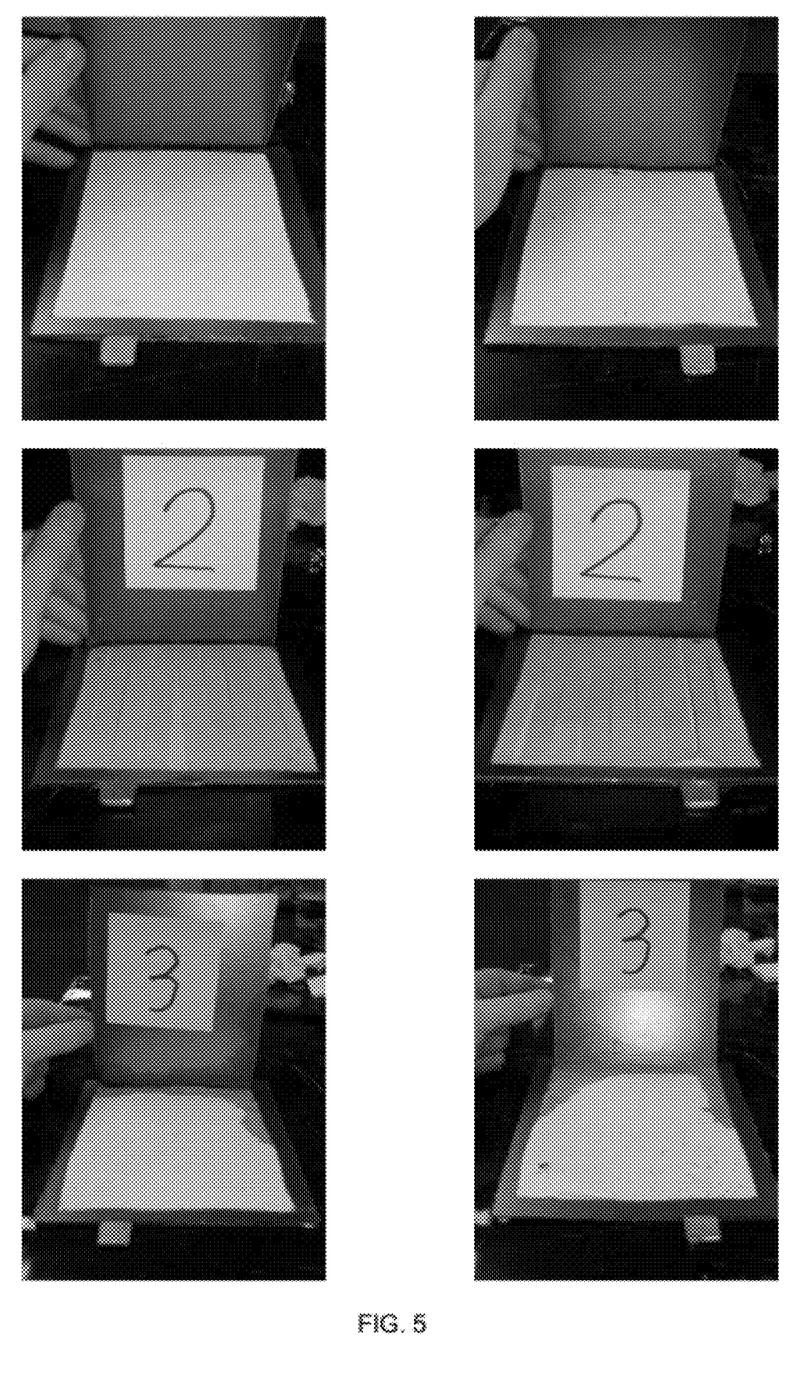
FIG. 5 shows acid leakage for an expanded graphite sheet or foil impregnated with furfural.

The 3 electrodes made of grafoil with 100% paraffin wax impregnation always leaked in the center indicating failure of the grafoil not the glue, as shown in FIG. 3. The 3 electrodes made of grafoil with 98% paraffin and 2% rosin gum impregnation had no evidence of acid leakage at all, as shown in FIG. 4. Two electrodes made of grafoil impregnated with furfural had no leaks, but the third did leak near the bottom edge and was probably caused by the glue adhering poorly to the grafoil, as illustrated in FIG. 5.

Example 2

Lead Lug on Tab Portion

Figure 6:
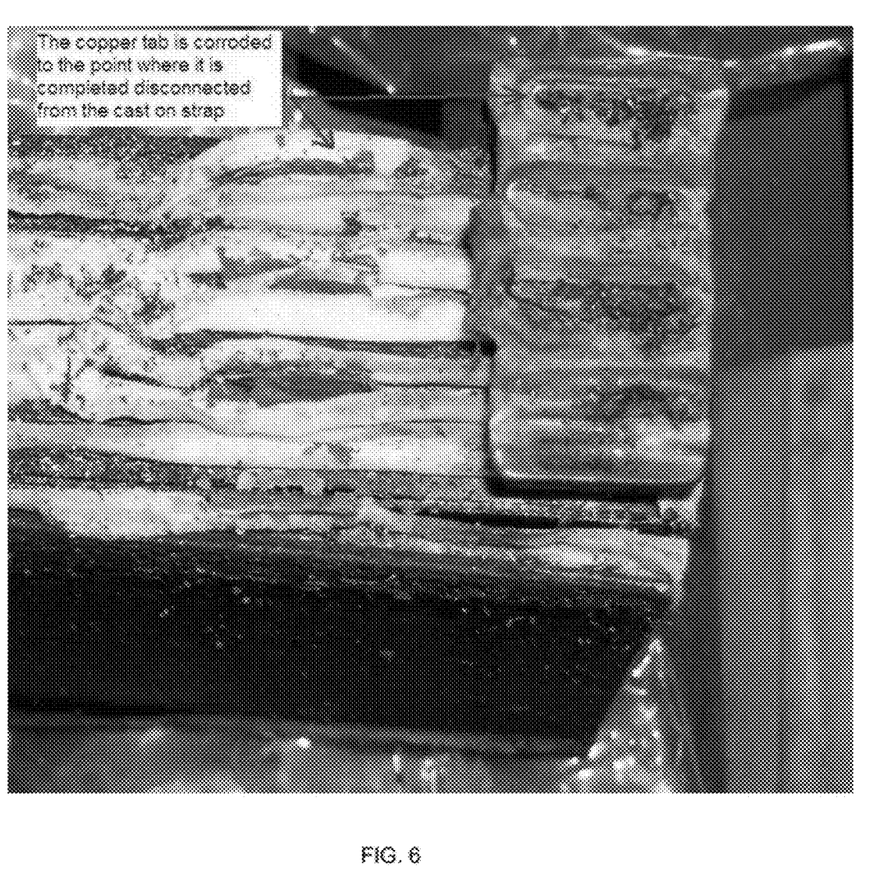
FIG. 6 shows corrosion of a tab element according to the prior art.
Figure 7A:
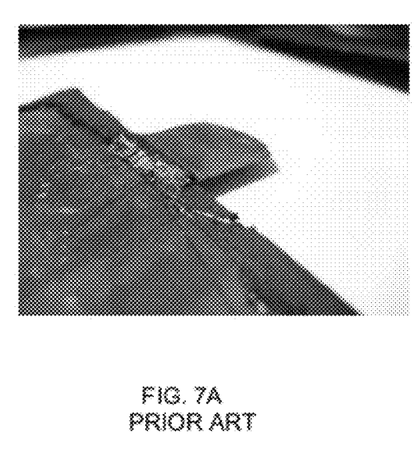
FIG. 7A shows a lead-tin coating on a tab element according to the prior art.

A lead-tin coating was used to protect a copper tab from corrosion, as illustrated in FIG. 7A. The lead-tin material corrodes and forms a corrosion resistance layer of lead sulfate. However, a cast on strapping process results in a significant depletion of the coating. During the COS operation, the tab is placed in contact with molten lead. The heated lead causes significant heating of the tab resulting in the melting of the protective lead-tin coating which is drawn into the lead strap, leaving the copper tab with a very thin protective coating. As a result, the copper tab corroded from a sulfuric acid electrolyte, as shown in FIG. 6.

Figure 7B:
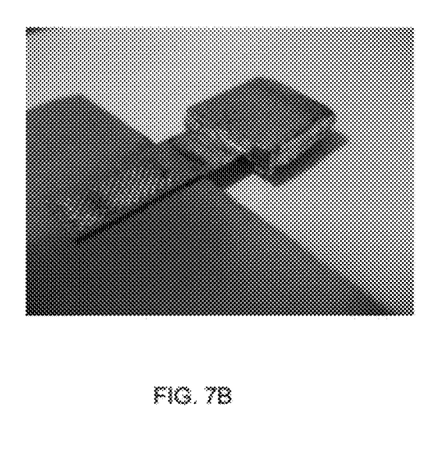
FIG. 7B shows a lug encapsulating at least part of a tab element according to the present invention.

A lead lug was molded onto a copper tab in place of a lead-tin coating, as illustrated in FIG. 7B. The lead lug did not melt during a COS operation and thus maintained a protective coating.

VI. INDUSTRIAL APPLICABILITY

A negative electrode comprises a current collector; a corrosion-resistant conductive coating secured to at least one face of the current collector; a sheet comprising activated carbon adhered to the corrosion-resistant conductive coating; and a tab portion extending from a side of the negative electrode as described above.

The negative electrode is particularly suited for hybrid energy storage devices.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

What is claimed is:

1. A negative electrode for a hybrid energy storage device, comprising:
    a current collector comprising copper or a copper alloy;
    a corrosion-resistant conductive coating secured to at least one face of the current collector;
    a sheet comprising activated carbon adhered to the corrosion-resistant conductive coating;
    a tab portion extending from a side of said negative electrode;
    a lug that encapsulates at least part of the tab portion; and
    a cast-on strap above the lug and encapsulating at least part of the lug.

2. The negative electrode of claim 1, wherein the sheet comprises:
5-95 wt % activated carbon,
5-95 wt % lead, and
5-20 wt % conductive carbon.

3. The negative electrode of claim 1, wherein a corrosion-resistant conductive coating is secured to both faces of said current collector, and a sheet comprising activated carbon is adhered to and in electrical contact with said corrosion-resistant conductive coatings on both faces of the current collector.

4. The negative electrode of claim 1, the current collector comprises a metallic material.

5. The negative electrode of claim 1, wherein the corrosion-resistant conductive coating comprises an expanded graphite sheet or foil impregnated with paraffin and rosin.

6. The negative electrode of claim 5, wherein the expanded graphite sheet or foil comprises low-density graphite having a density in the range of about 0.1 to about 2.0 g/cm$^3$.

7. The negative electrode of claim 1, wherein the current collector is in the form of a sheet, a foil, or a mesh.

8. The negative electrode of claim 7, wherein the current collector is in the form of a mesh having the corrosion-resistant conductive coating pressed into the mesh.

9. The negative electrode of claim 1, wherein the sheet of activated carbon further comprises at least one of polytetrafluoroethylene or ultra high molecular weight polyethylene.

10. The negative electrode of claim 1, wherein the corrosion-resistant conductive coating comprises a conductive diamond material.

11. The negative electrode of claim 1, wherein the lug has a thickness of about 0.05 mm to about 10 mm.

12. The negative electrode of claim 1, wherein the lug comprises lead or a lead alloy.

13. The negative electrode of claim 1, wherein the cast-on strap comprises lead or lead alloy.

14. The negative electrode of claim 13, wherein the cast-on strap comprises a lead alloy.

15. A negative electrode for a hybrid energy storage device, comprising:
a current collector comprising copper or a copper alloy;
a corrosion-resistant conductive coating secured to at least one face of said current collector, and comprising a graphite sheet or foil impregnated with paraffin and rosin;
a sheet comprising activated carbon adhered to the corrosion-resistant conductive coating;
a tab portion extending from a side of said negative electrode;
a lug that encapsulates at least part of the tab portion; and
a cast-on strap above the lug and encapsulating at least part of the lug.

16. The negative electrode of claim 15, wherein the sheet of activated carbon further comprises at least one of polytetrafluoroethylene or ultra high molecular weight polyethylene.

17. The negative electrode of claim 15, wherein the cast-on strap comprises lead or lead alloy.

\* \* \* \* \*